Oct. 5, 1971 P. F. PADDOCK 3,609,938
DEVICE TO PACK ARTICLES IN BOXES
Filed Dec. 18, 1968 10 Sheets-Sheet 6
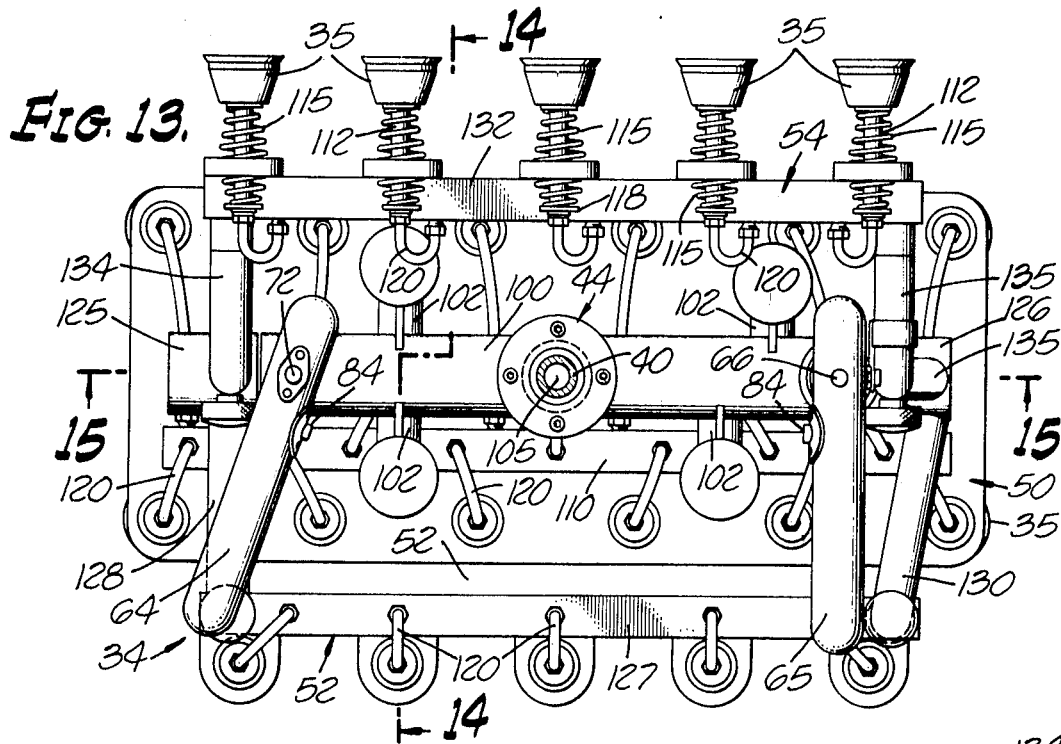
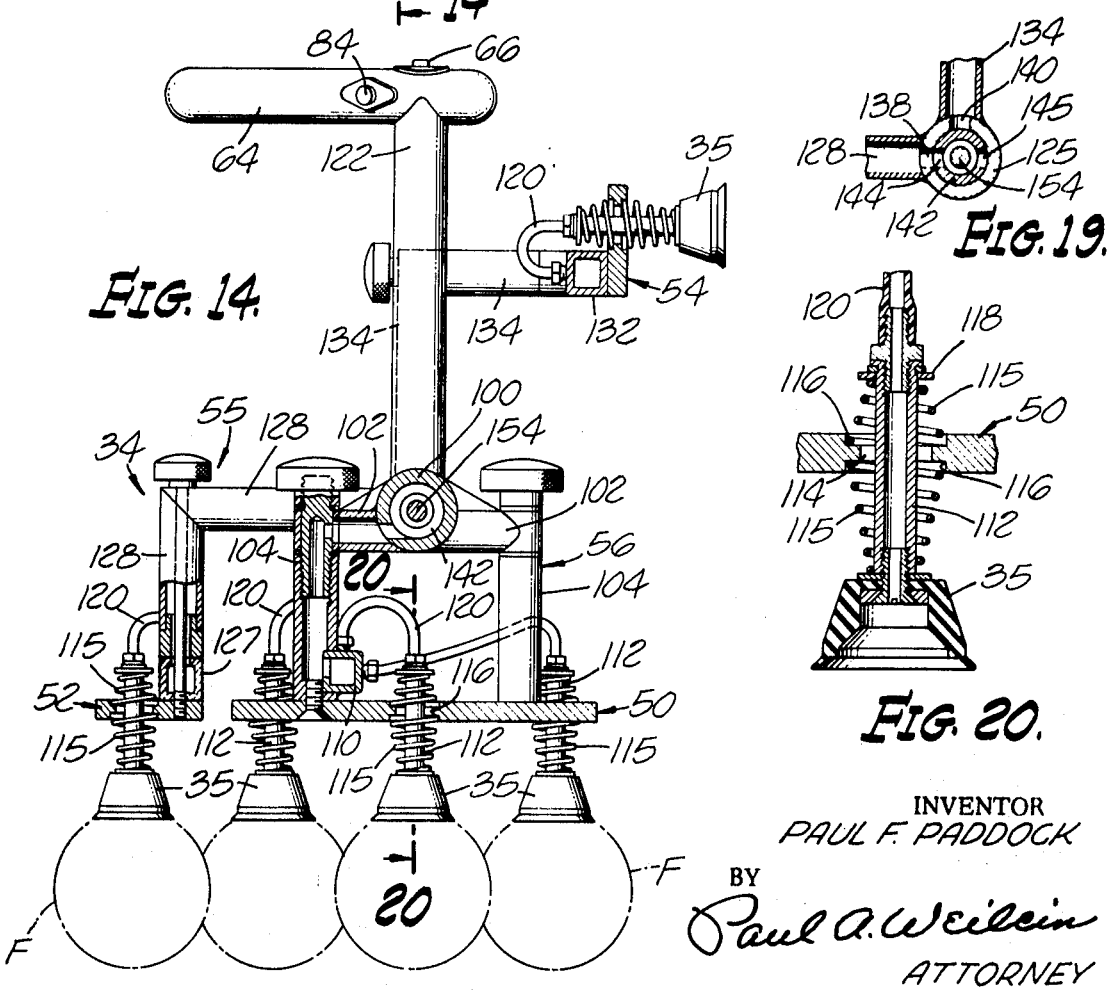
INVENTOR
PAUL F. PADDOCK
BY
Paul A. Weilein
ATTORNEY

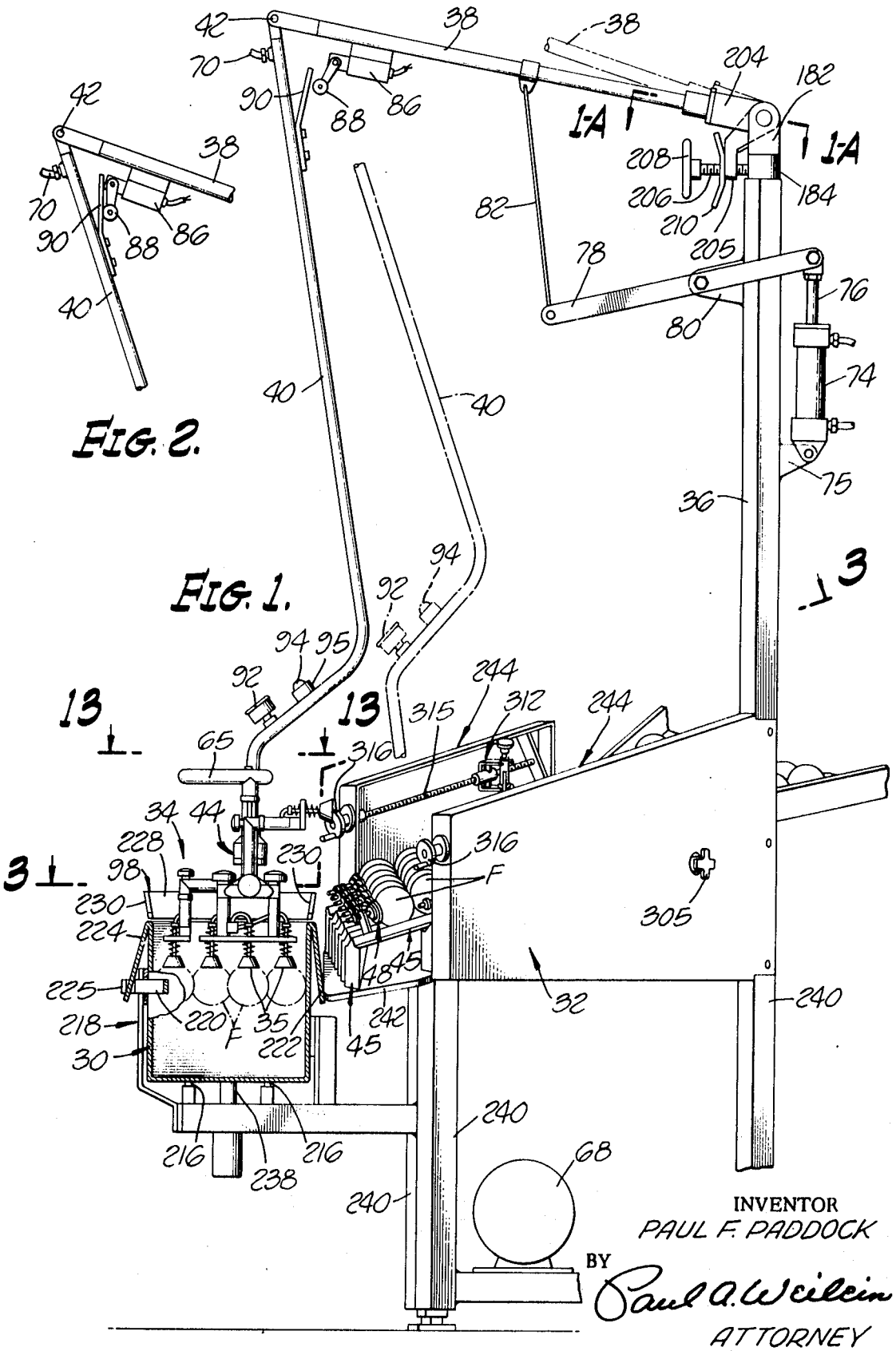

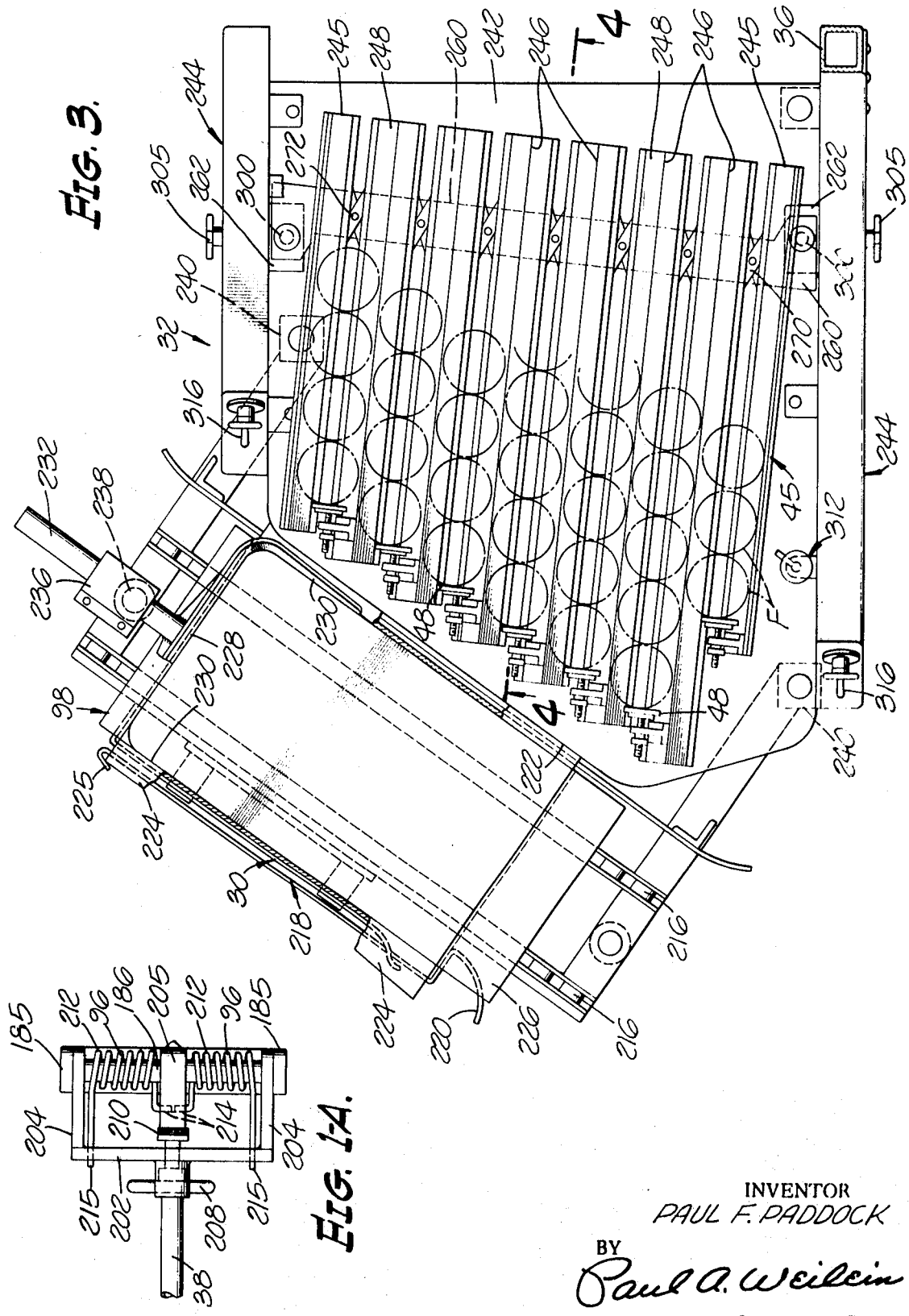

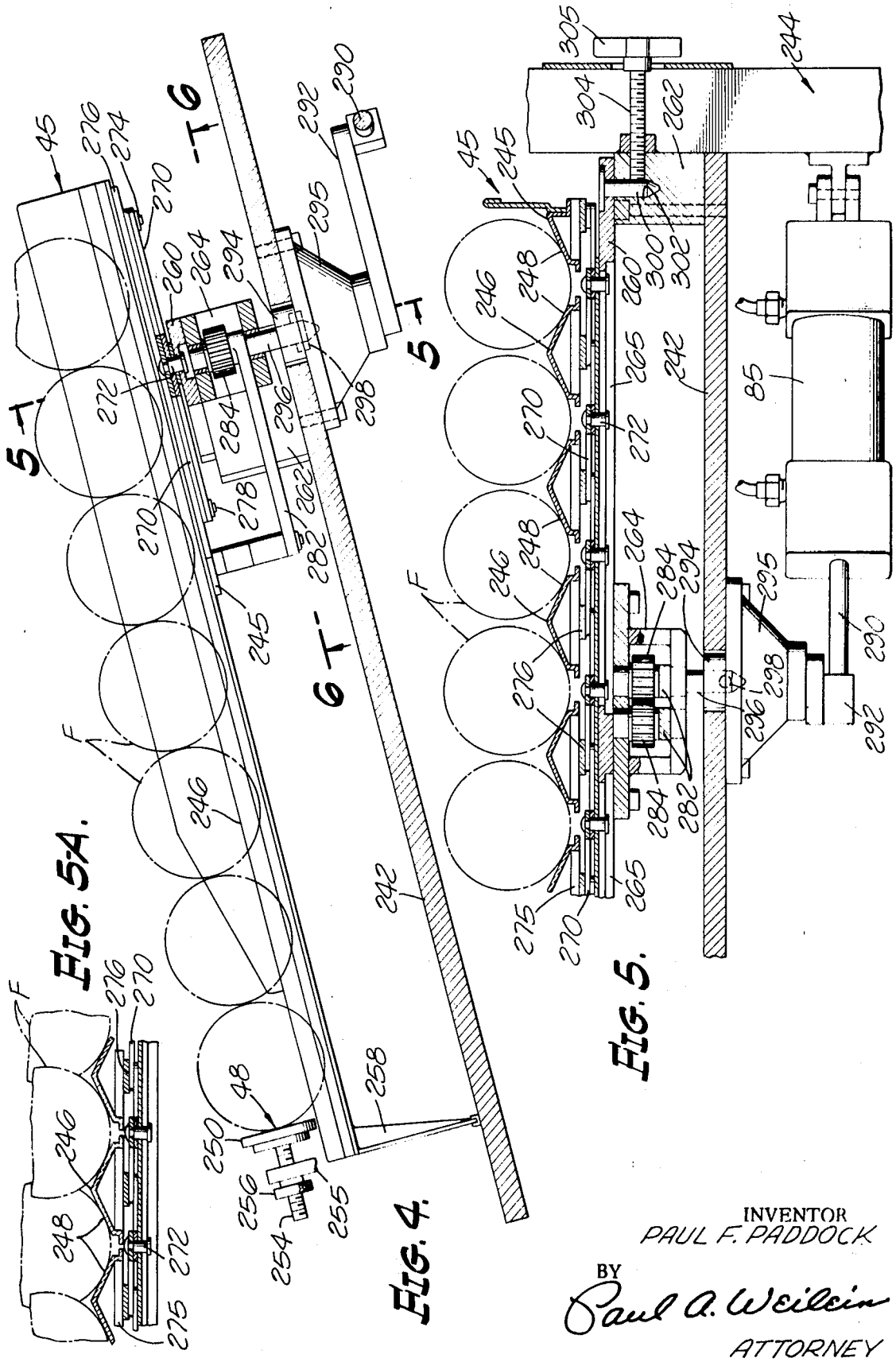

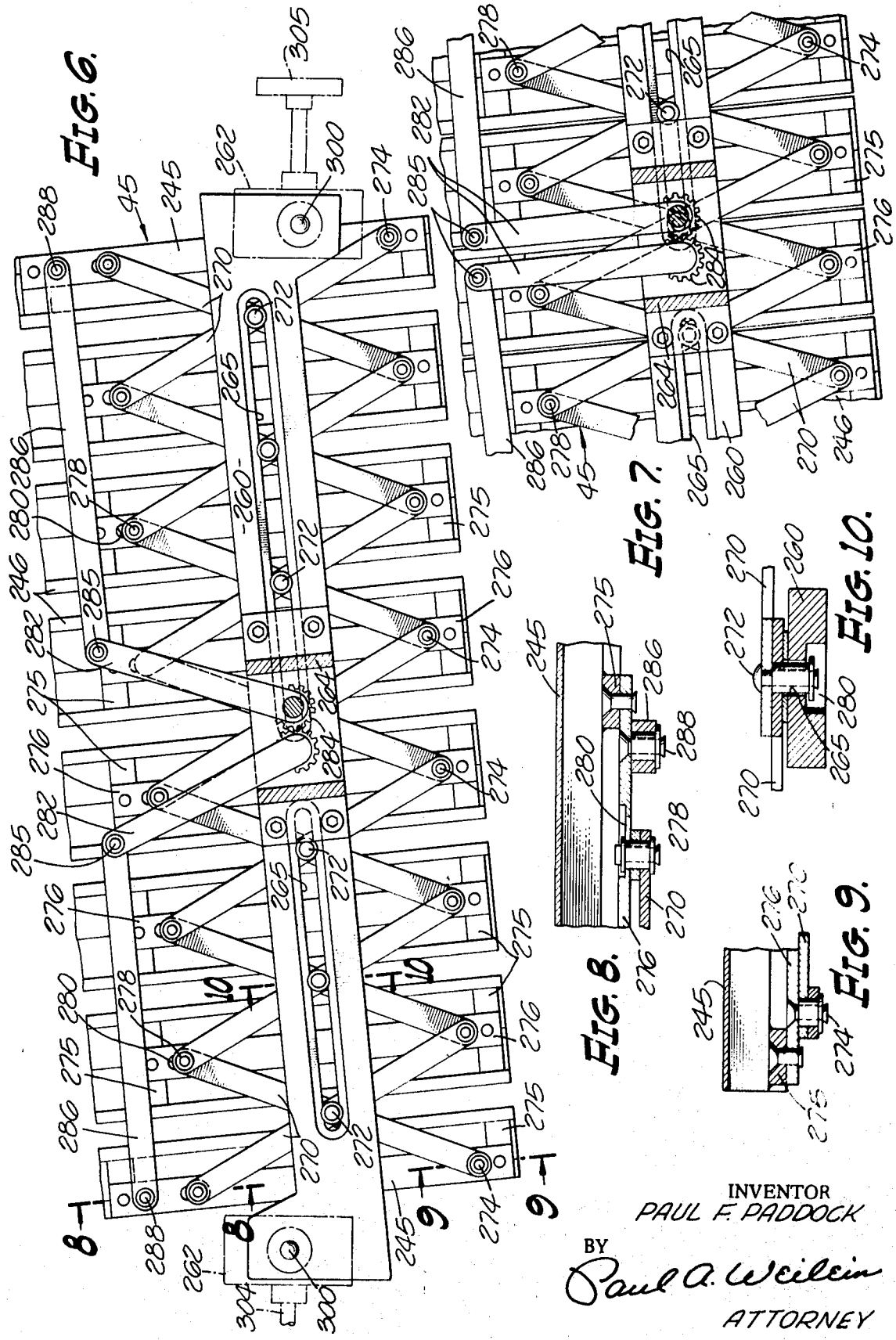

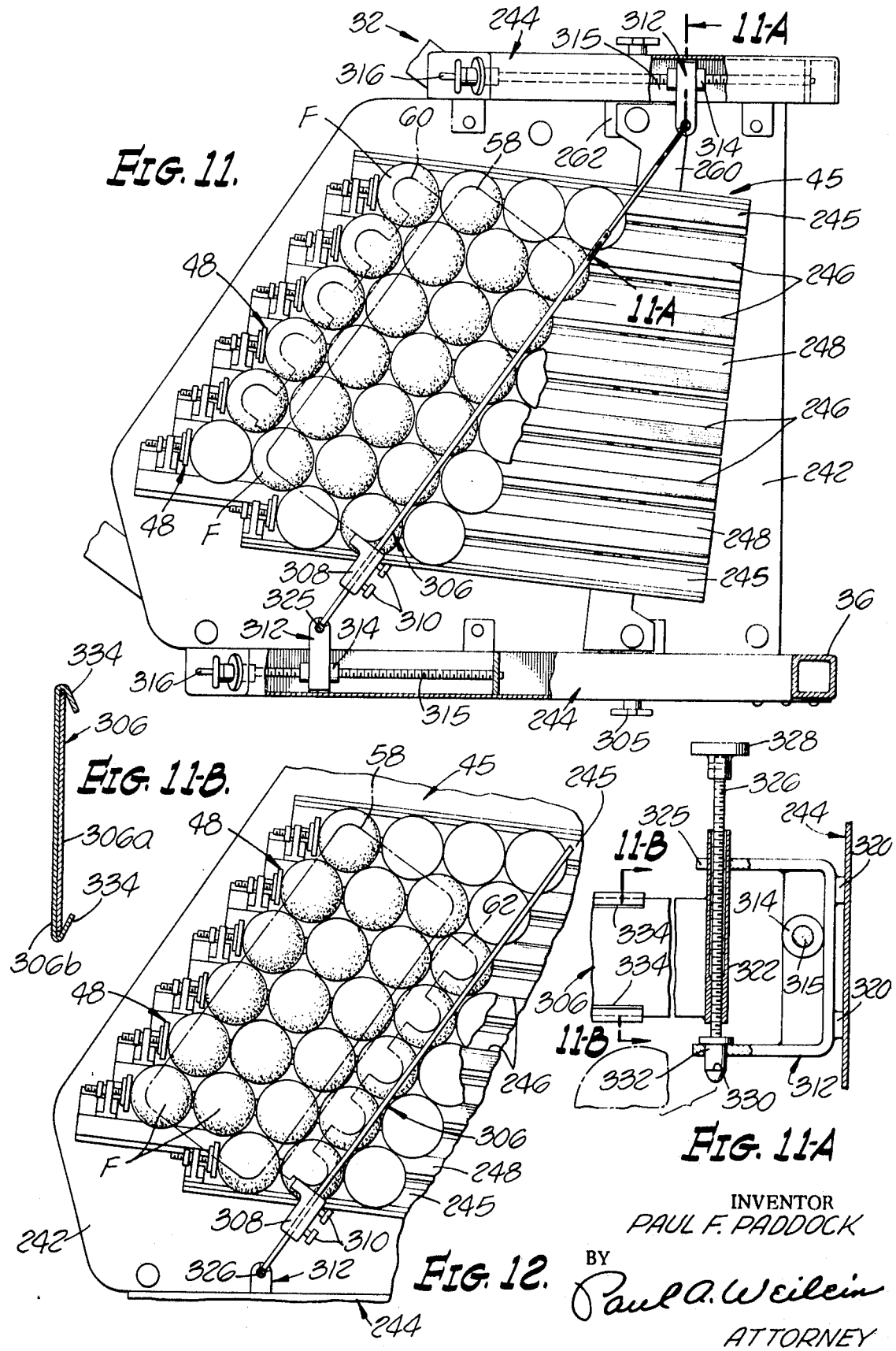

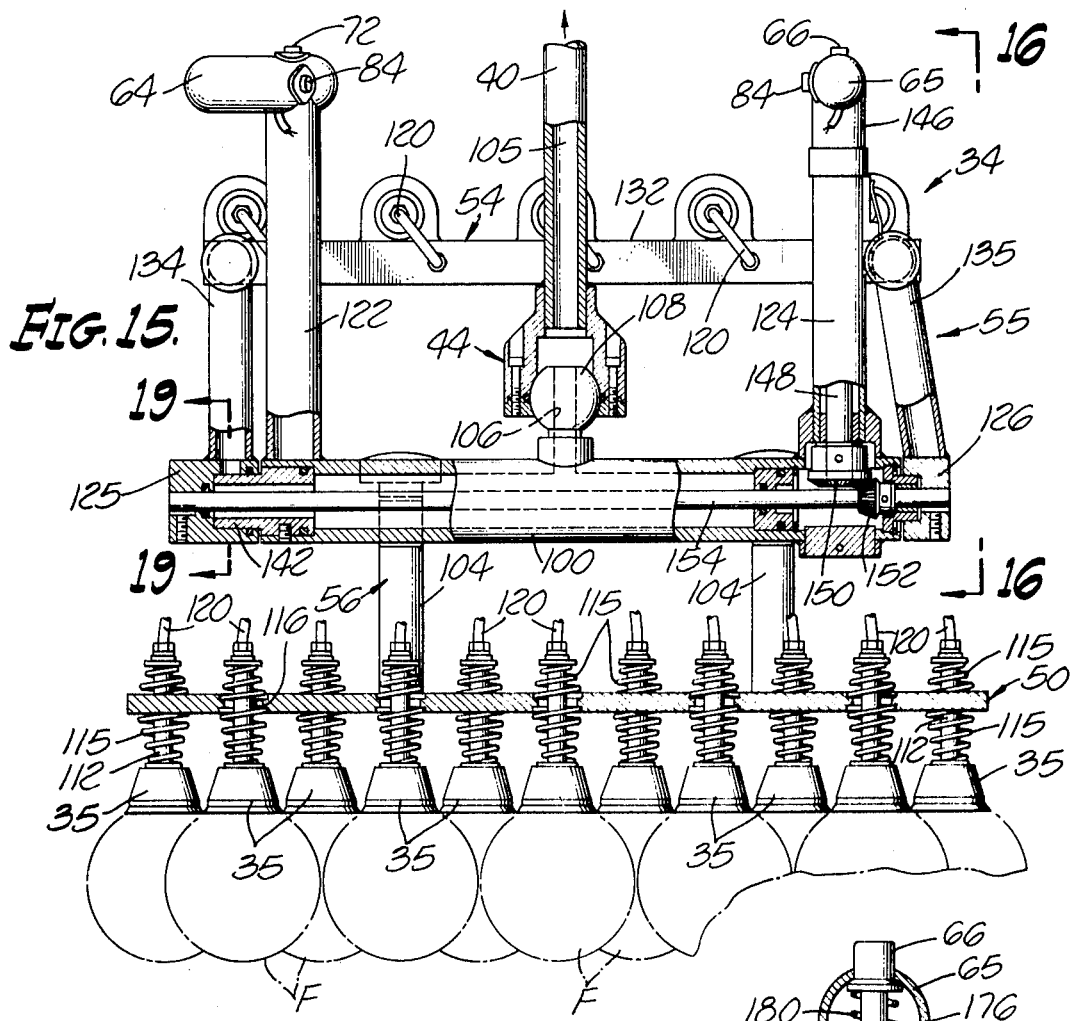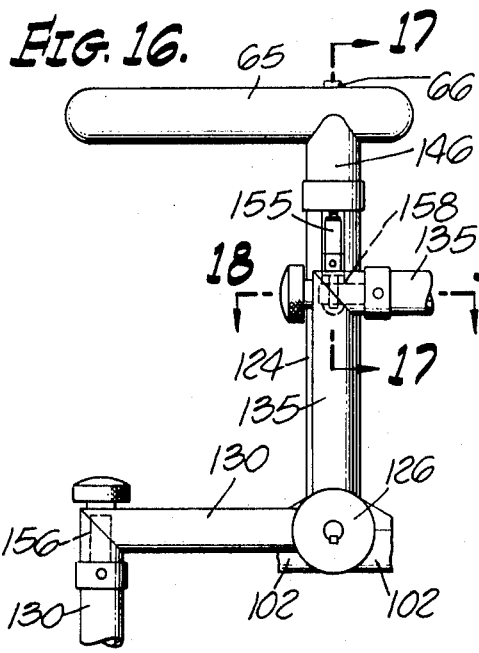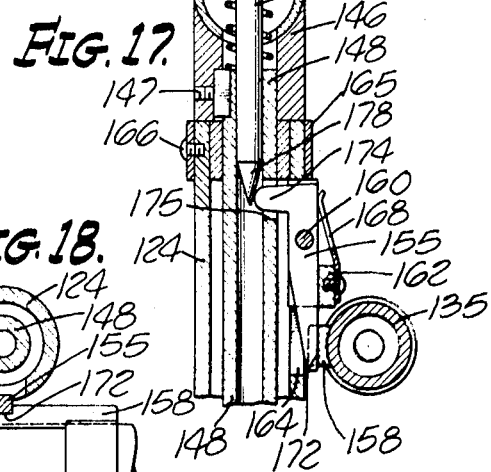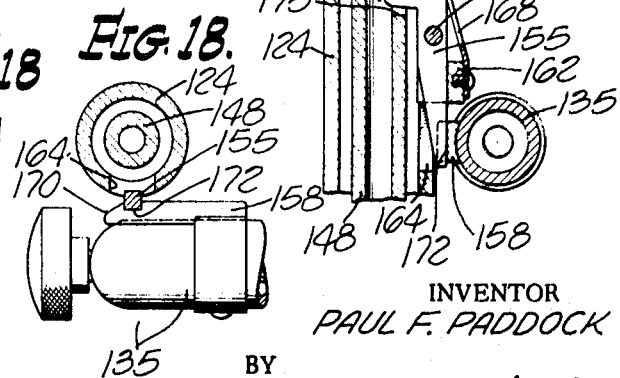

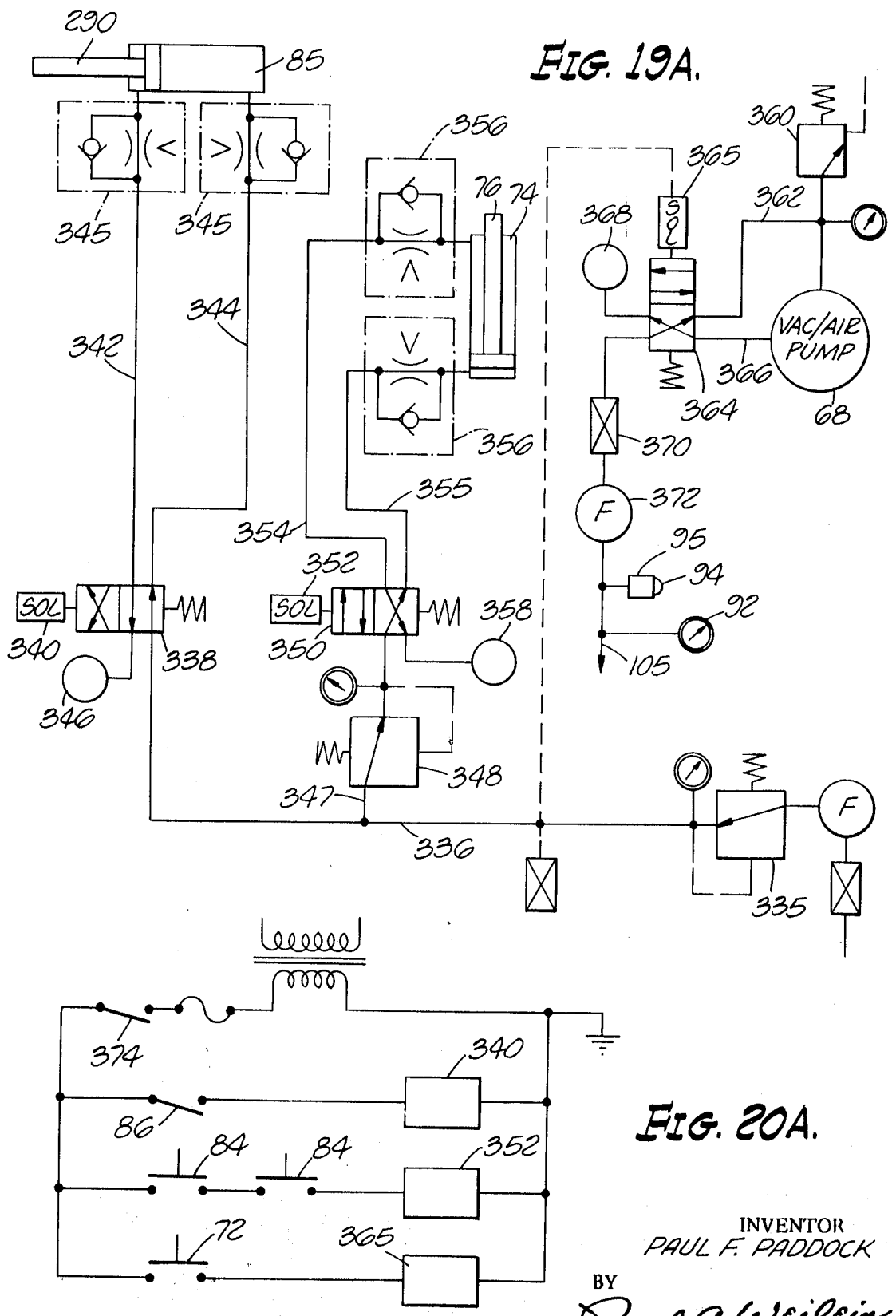

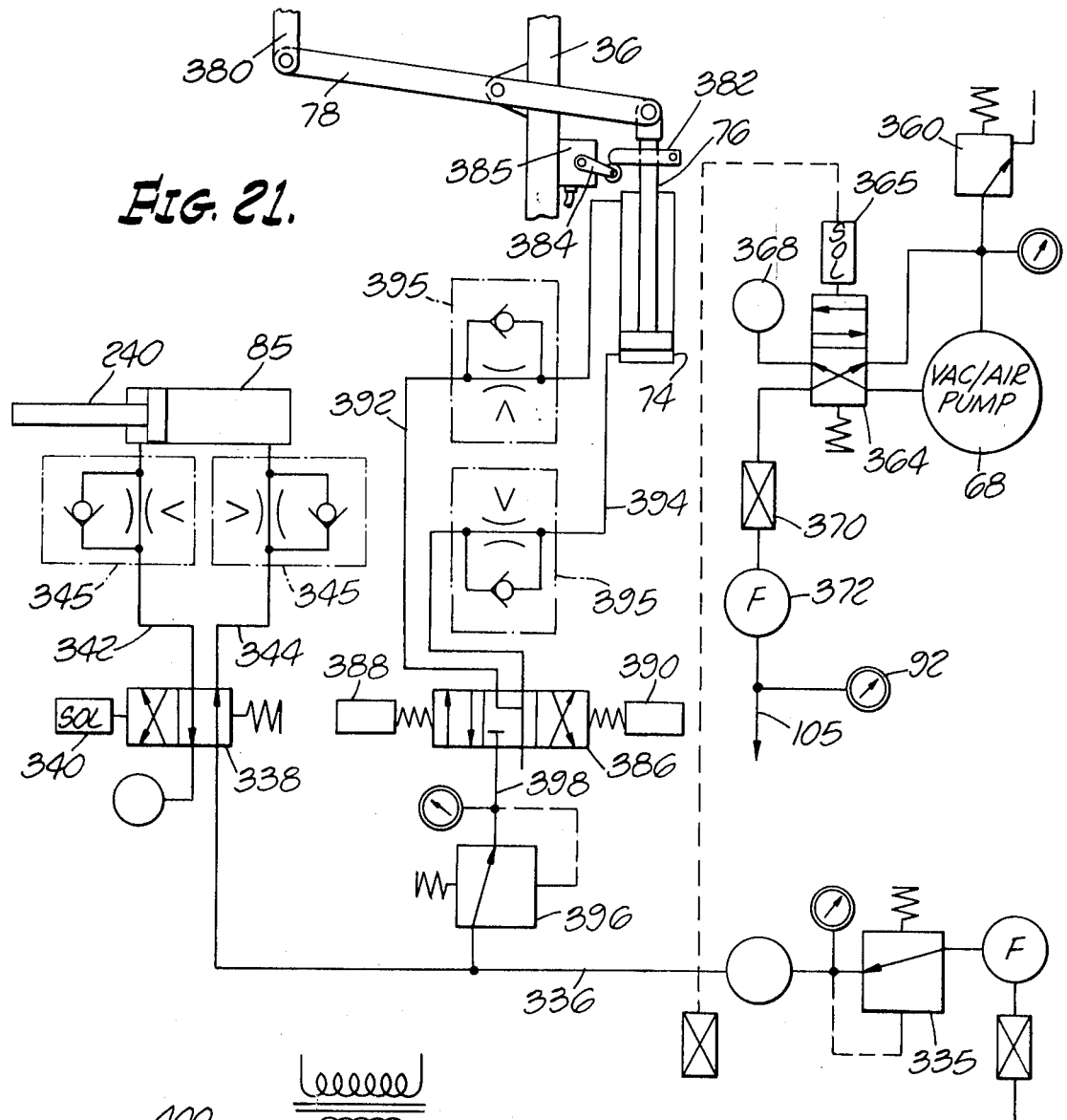

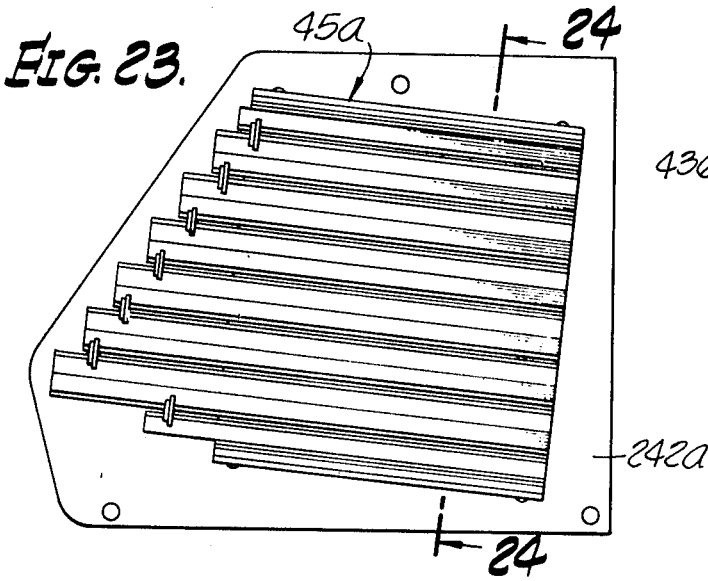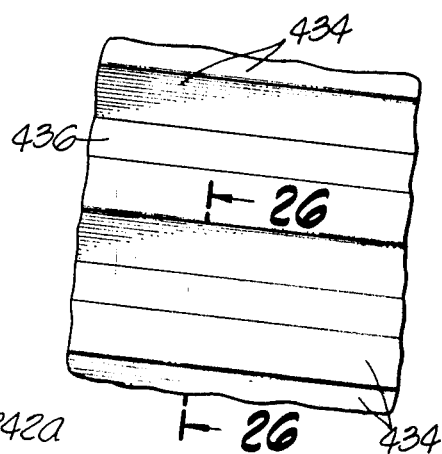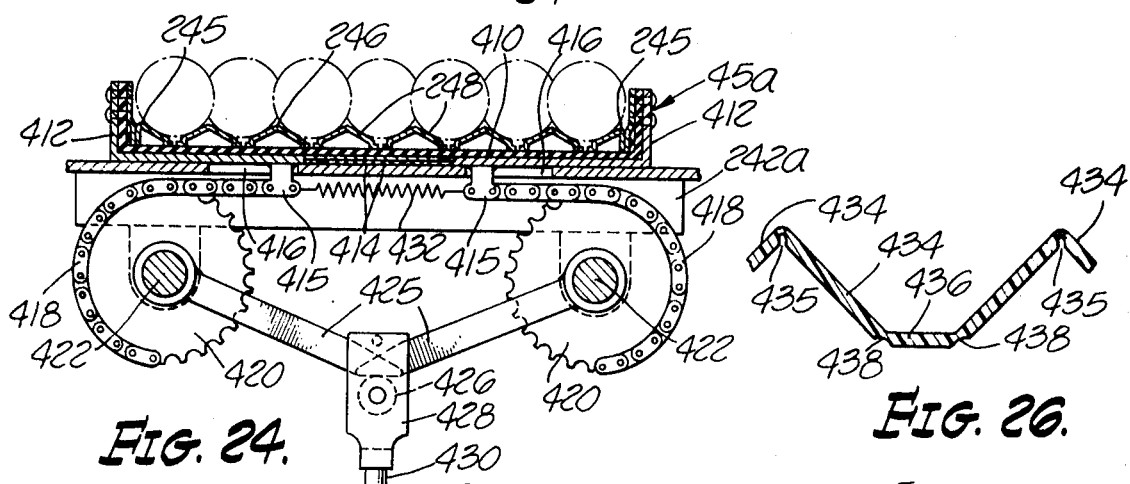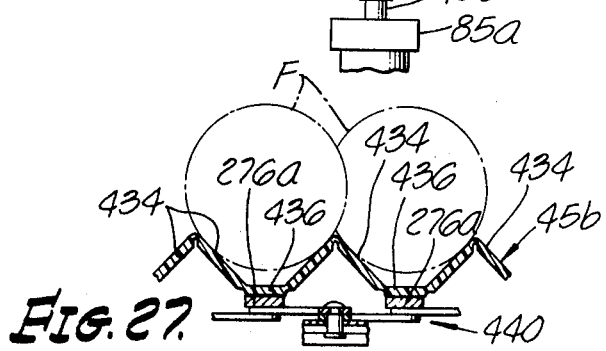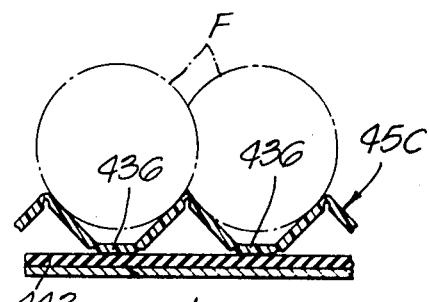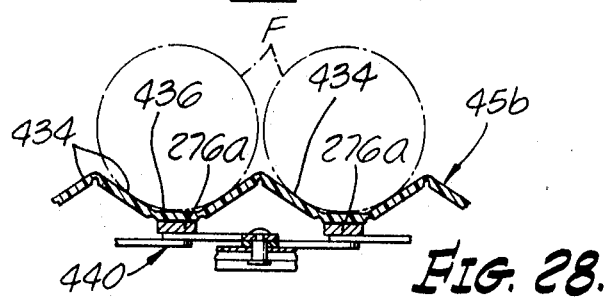

United States Patent Office 3,609,938
Patented Oct. 5, 1971

3,609,938
DEVICE TO PACK ARTICLES IN BOXES
Paul F. Paddock, Riverside, Calif., assignor to Sunkist Growers, Inc., Los Angeles, Calif.
Filed Dec. 18, 1968, Ser. No. 784,820
Int. Cl. B65b 5/08, 57/10; B66c 1/02
U.S. Cl. 53—61
22 Claims

ABSTRACT OF THE DISCLOSURE

A pickup assembly having vacuum cups to pick up a layer of fruit has two handles for manual movement between a pickup position at a supply station and a depositing position at a box. The pickup assembly is suspended from an overhead boom which acts as counterbalance means and is powered for boosting action at certain points in the operating cycle. Since proper nesting of fruit in a box requires layers of alternate patterns, the pickup assembly comprises a main pickup head with multiple rows of vacuum cups, a first single row auxiliary head cooperative with the main head to pick up a layer of one of the alternate patterns and a second single row auxiliary head for cooperation with the main head to pick up the other pattern, the two auxiliary heads being mounted on an auxiliary frame that is manually operable to move the two auxiliary heads to their cooperative positions alternately. With the pickup assembly poised to pick up a new layer of fruit, it is boosted downwardly into engagement with the fruit. If all of the vacuum cups engage fruit, means responsive to the consequent drop in air pressure boosts the pickup assembly upwardly to initiate movement toward the box. As the empty pickup assembly is lifted from the box, the operator manually shifts the auxiliary frame in preparation for picking up a layer of the alternate pattern.

BACKGROUND OF THE INVENTION

In the past, boxes of citrus fruit were packed entirely by hand, a worker using two hands to transfer the individual fruit from a convenient supply to a box. Since alternate layers in a box should partially nest together for compactness and to minimize bruising, the operator would arrange the fruit in two alternate layer patterns. For example, one such pattern of four rows of fruit has five fruit in the first and third rows and six fruit in the second and fourth rows. while the alternate pattern has six fruit in the first and third rows and five fruit in the second and fourth rows.

The high cost of such a manual packing procedure has led to the development of automatic and semi-automatic packing machines for higher production rates at lower labor cost. Such a machine, for example, may employ two different supply chutes that are adapted to supply the fruit in layers of the two patterns, respectively, and may further employ two different pickup heads designed, respectively, to pick up the two patterns. Each pickup head picks up its own pattern of fruit from its own supply chute and then moves to a position to deposit the fruit in a box, the two pickup heads moving to the box alternately so that one pickup head is depositing one layer of fruit in the box while the other pickup head is engaging a second layer of the fruit at its supply chute.

Such a packing machine obviously requires a high capital investment. Such a machine, moreover, is complicated with a large number of coordinated working parts. When ever it is necessary to stop the machine for repair, adustment, or changeover to a new fruit size, production of a whole department may be brought to a standstill at a high hourly cost.

There is a pressing need, therefore, for a less costly and less complicated fruit packing apparatus that, on the one hand, affords a production rate greatly exceeding a wholly manual packing procedure and, on the other hand, does not rely completely on automation. Such an apparatus should be capable of picking up a whole layer of fruit and should have some automatic or at least highly convenient features to save time and effort, but the operating cycle should rely heavily on the operator rather than depend on a complete built-in program.

The hypothetical apparatus would be especially desirable for a relatively small operator who cannot afford to invest in a fully automatic packing machine and who does not pack enough fruit for full utilization of such a large machine. The proposed machine would also be advantageous for an operator who packs a moderately large volume of fruit because, conceivably, a plurality of the machines would be competitive with a large automatic packer when certain considerations are taken into account. For example, a temporary failure would merely reduce the overall production of a packing department instead of bringing it to a dead stop; the production capacity of the packing department may be expanded in steps by buying new machines at moderate unit cost; and the proposed machine may be small enough and light enough to be readily transported from one growing area to another for use in different ripening seasons in different parts of the country.

The general object of the present invention is to provide what may be aptly termed a packer's aid to meet the above explained need.

SUMMARY OF THE INVENTION

The invention provides a manually movable pickup means or pickup assembly with a plurality of vacuum cups and further provides suitable counterbalance means for at least partially supporting the assembly to reduce the manual effort required to pick up a layer of fruit at a supply station and to transport the fruit to a box at a packing station. To enable the pickup assembly to pick up layers of alternate patterns, the assembly incorporates a main pickup head with a plurality of rows of vacuum cups, a first auxiliary pickup head with a single row of vacuum cups for cooperation with the main head to pick up a layer of one of the two alternate patterns, and a second auxiliary pickup head with a single row of vacuum cups for cooperation with the main head to pick up a layer of the alternate pattern. The two auxiliary pickup heads are mounted on an auxiliary frame of the pickup assembly that is manually rotatable between two positions for placing the two auxiliary pickup heads at their effective positions alternately. One of two handle means by means of which the pickup assembly is maneuvered is also operative for manual rotation of the auxiliary frame and the auxiliary frame is automatically engaged by a releasable latch when it is moved to either one of its two alternate positions.

An air pump is connected to the vacuum cups of the main pickup head and to the vacuum cups of whichever of the two auxiliary pickup heads is at its effective position and with the air pump in operation, movement of the pickup assembly against a group of fruit at the supply station results automatically in vacuum engagement of the fruit. If all of the vacuum heads effectively engage fruit, the pressure in a vacuum supply passage drops abruptly and a suitable signal means such as a red light responds to the drop in pressure. To release a layer of fruit into a box at the packing station, means on the pickup assembly is operable to admit air to the vacuum supply passage thereby to terminate the vacuum in the vacuum cups.

The counterbalance means of the preferred embodiment of the invention includes suitable power means to boost the movement of the pickup assembly and thereby reduce the physical effort required by the operator. Such a power means may be used to boost the downward movement of the pickup assembly into engagement with a group of fruit at the supply station. A feature of the invention in this regard is the provision of two separate manual controls on the pickup assembly which must be operated simultaneously by both of the operator's hands to avoid any possibility that one hand will be under the pickup means when the boosting action occurs.

A further feature of the preferred embodiment of the invention is the provision of a boosting force to accelerate the lifting of the pickup assembly when a group of fruit is effectively engaged by the vacuum cups. Preferably, this boosting action occurs automatically in response to the drop in pressure in the vacuum supply line that signals effective engagement of fruit by all of the vacuum cups.

In the preferred practice of the invention the counterbalance means includes an upright support structure, an overhead boom mounted on the upper end of the support structure, and a suspension arm supporting the pickup assembly from the boom. With the suspension arm freely swingable relative to the overhead boom and with the pickup assembly connected to the lower end of the suspension arm by a universal joint, the pickup assembly is free to assume any desired position relative to the suspension arm and may be raised or lowered as well as swung between a position to pick up fruit at the supply station and a position to deposit the fruit in a box at the packing station. For the convenience of the operator suitable means is provided at the supply station for guidance in positioning the pickup assembly relative to the supply fruit and suitable guide means is provided at the packing station to facilitate movement of the pickup assembly into a box.

The supply station comprises a channel assembly wherein a plurality of inclined channels permit gravitational supply of the fruit in parallel rows with the fruit of the successive rows staggered to permit compact lateral nesting of the rows of fruit. The fruit must be free to gravitate along the channels for a replenishment of the supply and, therefore, the rows of fruit must be temporarily liberally spaced apart whenever such replenishment is necessary. On the other hand, the rows of fruit must be brought compactly together in nesting relation to form a layer of the fruit. Accordingly, means is provided to expand the channel assembly for replenishment of the supply of fruit and to contract the channel assembly for compact grouping of the fruit.

A feature of the invention is the concept of providing power means to expand the channel assembly automatically for fruit replenishment while the pickup assembly is away from the supply station and to contract the channel assembly before the pickup assembly is returned to the supply station. In the presently preferred practice of the invention the power means for expanding and contracting the channel assembly is controlled by a switch means which responds to changes in angle of the suspension arm relative to the overhead boom on which it is pivotally mounted.

A further feature of the preferred practice of the invention is the concept of expanding the channel assembly by expanding and contracting the width of the individual channels instead of expanding and contracting the spaces between the channels. In one embodiment of the invention the opposite side walls of each channel are of fixed inclination and the spacing between the two side walls is variable, whereas in another embodiment of the invention the two side walls of each channel are variable in inclination for the purpose of varying the width of the channels. In either of these two embodiments of the invention the means for expanding and contracting the width of the channels comprises a support means that may be expanded or contracted. For example, the support means may be an elastomeric sheet that may be alternately stretched and relaxed to expand and contract the channel assembly or the support means may be a scissor linkage assembly that may be expanded and contracted for the same purpose.

Further features of the invention are in a control system for assistance in carrying out the operating cycle of the manually movable packer's aid.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a perspective view of the presently preferred embodiment of the invention;

FIG. 1-A is a fragmentary view taken as indicated by the line 1-A—1-A of FIG. 1, the view showing how counterbalance spring means is incorporated in the pivotal connection at the base end of the overhead boom;

FIG. 2 is a fragmentary elevational view showing how angular movement of the suspension arm operates a switch for controlling the channel assembly at the supply station;

FIG. 3 is a plan view of the supply chute at the packing station as seen along the line 3—3 of FIG. 1;

FIG. 4 is a longitudinal section of the channel assembly as the supply station taken along the line 4—4 of FIG. 3;

FIG. 5 is a fragmentary transverse section of the expanded channel assembly taken along the line 5—5 of FIG. 4;

FIG. 5A is a fragmentary section like FIG. 5 of the contracted channel assembly;

FIG. 6 is a bottom plan view of the expanded channel assembly as seen looking upward along the line 6—6 of FIG. 4;

FIG. 7 is a fragmentary view similar to FIG. 6 showing a portion of the contracted channel assembly;

FIGS. 8, 9, and 10 are frgamentary sectional views taken respectively on the lines 8—8, 9—9, and 10—10 of FIG. 6.

FIG. 11 is a plan view of the supply station indicating in phantom how one of the two auxiliary pickup heads of the pickup assembly cooperates with the main pickup head to pick up a fruit group of one of the two alternate patterns;

FIG. 11-A is a fragmentary section along the line 11-A—11-A of FIG. 11 indicating the construction of an adjustable overhanging baffle at the supply station;

FIG. 11-B is a section along the line 11-B—11-B of FIG. 11-A;

FIG. 12 is a view like FIG. 11 indicating how the second auxiliary pickup head cooperates with the main auxiliary head to pick up the alternate pattern of fruit;

FIG. 13 is a plan view of the pickup assembly as seen along the line 13—13 of FIG. 1;

FIG. 14 is a transverse section of the pickup assembly taken along the line 14—14 of FIG. 13;

FIG. 15 is a longitudinal section of the pickup assembly taken along the line 15—15 of FIG. 13;

FIG. 16 is a fragmentary elevational view of the pickup assembly as seen along the line 16—16 of FIG. 15 and showing how the auxiliary frame that carries the two auxiliary pickup heads is latched at one of its alternate limit positions;

FIG. 17 is an enlarged section taken as indicated on the line 17—17 of FIG. 16 to show the latch mechanism;

FIG. 18 is a fragmentary section along the line 18—18 of FIG. 16 also showing the latch mechanism;

FIG. 19 is a fragmentary sectional view taken along the line 19—19 of FIG. 15;

FIG. 19A is a diagram of a pneumatic system that may be incorporated in the control system of the apparatus;

FIG. 20 is a fragmentary sectional view taken along the line 20—20 of FIG. 14;

FIG. 20A is a wiring diagram showing the switches that are employed in the control system;

FIG. 21 is a diagram similar to the diagram of FIG.

19 showing a modification of the pneumatic system that may be employed;

FIG. 22 is a modified wiring diagram showing a switching arrangement for cooperating with the pneumatic system of FIG. 21;

FIG. 23 is a plan view of a modification of the channel assembly;

FIG. 24 is a section along the line 24—24 of FIG. 23;

FIG. 25 is a fragmentary plan view of a folded channel structure;

FIG. 26 is a transverse section along the line 26—26 of FIG. 25;

FIG. 27 is a fragmentary sectional view of a modification of the channel assembly that incorporates the folded structure, the channel assembly being shown in contracted state;

FIG. 28 is a view similar to FIG. 27 with the channel assembly expanded; and

FIG. 29 is a view similar to FIG. 27 showing another modification of the channel assembly incorporating the folded structure.

DESCRIPTION OF THE PREFERRED EMBODIMENTS OF THE INVENTION

General arrangement

Referring first to FIG. 1, the apparatus includes: a packing station to seat a box 30 that is to be packed with citrus fruit; a supply station in the form of an inclined supply chute 32 where rows of individual citrus fruit designated F are repeatedly replenished; a pickup means or assembly generally designated 34 having vacuum cups 35 to engage individual fruit; and means to counterbalance and boost the pickup assembly, the counterbalancing and boosting means including an upright support 36, an overhead boom 38 pivotally mounted on the upright support, and a depending suspension arm 40 which is pivotally connected to the outer end of the boom and supports the pickup assembly 34 by means of a ball-type universal joint 44.

The fruit F that is continually available at the upper end of the supply chute 32 rolls onto a channel assembly, generally designated 45, comprising a plurality of slightly inclined parallel channels down which the fruit may roll by gravitation to form parallel rows. Each row of fruit abuts an adjustable stop 48 to position each row of fruit in staggered relation to the adjacent row or rows.

The channel assembly 45 has two alternate states, namely, an expanded state shown in FIG. 3 where the rows of fruit are spaced sufficiently apart to permit the fruit to gravitate down the channels without one row interfering with another, and a contracted state shown in FIGS. 11 and 12 where the rows of fruit are crowded together sufficiently to cause the rows to nest together.

To compact the fruit compactly in a box 30 and to minimize bruising of the fruit during shipment, the successive layers of fruit in the box must be of two alternate patterns to permit the successive layers to nest together. For example, the shaded fruit in FIG. 11 forms a layer of what may be termed a first pattern wherein the first and third rows, counting from the left, comprise five fruit each, and the second and third rows comprise six fruit each. In FIG. 12 the shaded fruit form what may be termed a second pattern wherein the first and third rows each comprises six fruit while the third and fourth rows each comprises five fruit. The two patterns are complementary to each other in the sense that when one pattern is superimposed on the other, the fruit of the upper pattern nest in depressions formed by the lower pattern.

As best shown in FIG. 14, the pickup assembly includes three pickup heads, namely a main pickup head 50 having three rows of vacuum cups 35, a first auxiliary pickup head 52 having a single row of five vacuum cups 35, and a second auxiliary pickup head 54 which also has a row of five vacuum cups 35. In FIG. 14 the first auxiliary head 52 is in its operating position alongside the main pickup head 50, while the second auxiliary pickup head 54 is retracted to an upper idle position.

The two auxiliary heads 52 and 54 are fixedly mounted on an auxiliary frame 55 which is pivoted to the main frame 56 to rock between two alternate positions to place the two auxiliary heads alternately at their operating positions. As indicated by the phantom rectangles 58 in FIGS. 11 and 12, the main pickup head 50 picks up three rows of fruit comprising two outer rows of six each and an intermediate row of five fruit. When the first auxiliary head 52 is in its operating position to the left of the main pickup head as indicated by the phantom outline 60 in FIG. 11, the pickup assembly is capable of picking up a layer of the first pattern and on the other hand when the second auxiliary head 54 is in its operating position as indicated by the phantom outline 62 in FIG. 12, the pickup assembly is capable of picking up a layer of the second pattern.

For manual maneuvering of the pickup assembly 34, the main frame 56 is provided with a rigid left hand handle 64 (FIGS. 13 and 14) and is provided with a right hand handle 65 that is operatively connected to the auxiliary frame 55 and may be swung laterally between two alternate positions to rock the auxiliary frame between its two alternate position. The auxiliary frame 55 is automatically latched at each of its two positions and may be unlatched by depression of a release button 66 on the right hand handle.

Referring to FIG. 1, normally all of the vacuum cups 35 of the pickup assembly draw air from the atmosphere because they are in communication with a continuously running air pump designated 68, the line of communication including a hose 70 that is connected to the suspension arm 40 to the pickup assembly. Consequently, whenever all of the vacuum cups of the pickup assembly contact fruit at the supply station, a vacuum immediately develops in all of the vacuum cups to cause all of the vacuum cups to engage fruit. On the other hand, failure of any one vacuum cup to make effective contact with a fruit prevents creation of a vacuum and makes all of the vacuum cups ineffective.

To release a layer of fruit from the pickup assembly into a box 30, the operator depresses a push button switch 72 (FIG. 13) on the left hand handle 64. As will be explained, the push button switch 72 actuates remote valve means to shift the connection of the hose 70 to the air pump 68 from the intake port of the pump to the discharge port with the consequent discharge of compressed air into the vacuum system to cause instant release of the fruit.

As shown in FIG. 1, the means for boosting the movement of the pickup assembly 34 includes a booster cylinder 74 that is supplied with compressed air from a suitable source and is pivotally mounted on a bracket 75 of the upright support 36. A piston rod 76 extending from the booster cylinder is pivotally connected to one arm of a lever 78 that is pivotally mounted on a second bracket 80 with the second arm of the lever connected to the overhead boom 38 by means of a cable 82. The booster cylinder 74 is remotely controlled by a pair of push button switches 84 (FIG. 13) on the inner sides of the two handles 64 and 65, respectively, the two push button switches being in series so that the boosting action can be created only when the operator actuates both switches.

Expansion and contraction of the channel assembly 45 at the supply station is accomplished by means of a power cylinder 85 shown in FIG. 5, the power cylinder being connected to the previously mentioned source of compressed air. To control the power cylinder 85 automatically, a switch 86 is mounted on the overhead boom 38, as shown in FIG. 1, and is provided with an operating arm 88 for actuation by a finger 90 on the suspension arm 40. When the pickup assembly 34 is at the packing station as shown in FIG. 1, the finger 90 is spaced away from the operating arm 88 of the switch and the channel assembly 45 is in its expanded state to permit free gravitational rolling of the fruit down the channels at the supply station. When the pickup assembly 34 is moved towards the supply station, however, as indicated by the dotted position of the suspension arm 40, the change in angle of the suspension arm relative to the overhead boom 38 brings the finger 90 against the switch arm 88, as shown in FIG. 2, to operate the power cylinder 85 for contraction of the channel assembly in preparation for employment of the pickup assembly to engage a new layer of fruit at the supply station.

Summary of the operating cycle

Normally, the operator continuously grips both of the handles 64 and 65 of the pickup assembly for the purpose of moving the assembly manually between the supply station and the packing station. Starting with an empty box 30 at the packing station, the movement of the pickup assembly towards the supply station actuates the switch 86 to contract the channel assembly 45 to nest together the rows of fruit as shown in FIGS. 11 and 12. With the first auxiliary pickup head 52 in its operating position to enable the pickup assembly to pick up a layer of the first pattern, and with the pickup assembly poised immediately over the fruit on the contracted channel assembly as indicated by the phantom outlines 58 and 60 in FIG. 11, the operator depresses both of the push button switches 84 on the two handles respectively to energize the booster cylinder 74 for downward thrust of the pickup assembly against the rows of fruit without requiring any effort on the part of the operator.

If all of the vacuum cups 35 make effective engagement with the corresponding fruit, the pressure in the air line in the suspension arm 40 drops abruptly and the operator may note the drop in pressure on a pressure gauge 92 on the suspension link 40. In the preferred embodiment of the invention, the drop in air pressure energizes a signal lamp 94 by means of a pressure-responsive switch 95 to inform the operator that a complete layer of fruit is engaged by the pickup means. The operator then moves the pickup assembly to the packing station with the weight of the loaded pickup assembly largely counterbalanced by a pair of torque springs 96 (FIG. 1-A) that bias the overhead boom 38 upwardly. At the packing station the operator maneuvers the pickup assembly against a guide baffle 98 (FIGS. 1 and 3) to guide the pickup assembly into the interior of the box and to compress the suspended layer of fruit laterally to a slight degress to fit into the box. With the pickup assembly at a desired position inside the box, the operator depresses the push button switch 72 to release the new layer of fruit. At this time while the pickup assembly 34 is at the packing station the finger 90 is out of contact with the switch arm 88 to cause the channel assembly 45 to be expanded for free gravitational replenishment of the fruit at the supply station.

As the operator lifts the pickup assembly 34 from the box 30 and starts the movement of the pickup assembly towards the supply station, the operator depresses the release button 66 on the right hand handle 65 and swings the right hand handle counterclockwise as viewed in FIG. 13 to cause the auxiliary frame 55 of the pickup assembly to swing to its alternate position thereby to retract the first pickup head 52 and swing the second auxiliary pickup head 54 to its effective position. As the operator continues the movement of the pickup assembly towards the supply station, the finger 90 on the suspension arm 40 again operates the switch 86 to cause contraction of the channel assembly thereby to make a compactly grouped new layer of fruit available. With the second auxiliary pickup head 54 in its lower operating position, the operator maneuvers the pickup assembly into the position indicated by the phantom lines 58 and 62 in FIG. 12 in preparation for picking up a layer of fruit of the second pattern.

Preferably, different pickup assemblies are available for use interchangeably and different channel assemblies are also available for use interchangeably to permit changeover from one size of fruit to another. For this purpose, the pickup assembly shown in the drawings is releasable from the suspension arm 40 at the universal joint 44 and the channel assembly 45 is removably mounted on the supply chute 32.

Structural details of the pickup assembly

As heretofore stated, the main pickup head which comprises the plate 50 is carried by a main frame 56, as best shown in FIG. 14. The main frame includes a longitudinal cylinder 100 best shown in FIG. 15 from which extend four short horizontal tubes 102, best shown in FIG. 13, which in turn carry corresponding downwardly extending tubes 104, best shown in FIG. 14, the lower ends of which carry the main plate or main pickup head 50. As indicated in FIG. 15, the passage 105 of the tubular suspension arm 40 communicates with a diametrical passage 106 of the ball member 108 of the previously mentioned universal joint 44 and the passage 106 communicates in turn with the interior of the cylinder 100. As best shown in FIG. 14, a longitudinal vacuum manifold 110 is mounted on the lower ends of two of the downwardly extending tubes 104 and is in communication with the cylinder 100 through at least one of the downwardly extending tubes 104 and the corresponding horizontal tube 102.

As shown in cross section in FIG. 20, each of the vacuum cups 35 of the main pickup head is mounted on the lower end of a tubular shank 112 which is yieldingly mounted in a corresponding aperture 114 in the plate 50. In the construction shown, the tubular shank is yieldingly mounted by a pair of opposed spiral springs 115 which nest into corresponding annular seats 116 with one spiral spring backing against the vacuum cup 35 and the other backing against a flange 118 at the upper end of the tubular shank. As best shown in FIG. 14, the three rows of tubular shanks 112 of the main pickup head are connected to the vacuum manifold 110 by means of corresponding flexible tubes 120.

The previously mentioned left hand handle 64 and right hand handle 65 are mounted respectively on two tubes 122 and 124 (FIG. 15) that extend rigidly upwardly from the cylinder 100.

As shown in FIG. 15, the previously mentioned auxiliary frame 55 includes two caps 125 that are rotatably mounted on the opposite ends respectively of the cylinder 100. As shown in FIG. 14, the longitudinal plate 52 that comprises the first auxiliary head is mounted on a longitudinal vacuum manifold 127, as shown in FIGS. 13, 14, and 15, the two ends of the vacuum manifold are mounted on the two rotatable caps 125 and 126 by angular tubular arms 128 and 130, respectively. In like manner, the plate 54 that comprises the second auxiliary frame is mounted on a vacuum manifold 132 which is carried by two angular tubular arms 134 and 135 which in turn are mounted on the same two rotary caps 125 and 126, respectively. As may be seen in FIG. 14, the vacuum cups 35 of the two auxiliary pickup heads 52 and 54 are supported by spiral springs in the manner heretofore described with the tubular shanks 112 of the vacuum cups connected to the vacuum manifolds 126 and 132 by suitable flexible tubes 120.

As heretofore stated, when the pickup assembly 34 is in use, the air pump 68 continuously withdraws air from the atmosphere through the vacuum cups 35 of the main pickup head and the vacuum cups of whichever auxiliary pickup head is in its operating position and it is essential that the vacuum cups of whichever auxiliary head is retracted be completely cut off from the air pump. FIG. 19 shows a valve arrangement which places the air pump in communication with the vacuum cups of whichever auxiliary pickup head is in use and at the same time cuts off the vacuum cups of the other auxiliary head.

In FIG. 19 an angular tubular arm 128 of the first auxiliary head 52 is connected to the rotary cap 125 and the corresponding angular tubular arm 134 of the second auxiliary head 54 is also connected to the same cap at an angle of 90° relative to the angular tubular arm 128. The rotary cap 125 has a port 138 in communication with the angular arm 128 and a port 140 is communication with the angular tubular arm 134. As shown in FIGS. 15 and 19, a bushing 142 which is fixedly mounted in the cylinder 100 extends into the cap 125 to function as a valve member. For this purpose the bushing 142 is formed with two diametrically opposite radial ports 144 and 145.

When the first auxiliary pickup head 52 is in its lower effective position as shown in FIG. 14, the angular tubular arm 128 is in communication with the cap 125, as may be seen in FIG. 19, and thus is in communication with the interior of cylinder 100, but since port 140 of the rotary cap is out of register with ports 144 and 145 of bushing 142, the second auxiliary pickup head 54, which is in its upper retracted position, is cut off from communication with the air pump. Thus, rotating the auxiliary frame 55 between its two limit position alternately places the air pump in communication wth the two auxliary pickup heads.

For the purpose of manually rocking the auxiliary frame 55 between its two alternate positions, the right hand handle 65 has a downward cylindrical extension 146 by means of which it is rotatably mounted on the upper end of the upright tube 124. As shown in FIG. 17, the cylindrical extension 146 of the right hand handle 65 is rigidly connected by a set screw 147 to the upper end of a tubular control shaft 148. As shown in FIG. 15, the lower end of the tubular control shaft 148 carries a bevelled gear 150 in mesh with a bevelled gear 152 on a longitudinal shaft 154 that is journalled in the cylinder 100 and is keyed to the end cap 126 for rotation of the auxiliary frame 55. At the position of the right hand handle 65 that is shown in FIGS. 13 and 15, the auxiliary frame is rotated to the limit position at which the auxiliary head 52 is in its lower effective position and the auxiliary head 54 is in its elevated ineffective position. If the right hand handle 65 is swung approximately 45° counterclockwise from the position shown in FIG. 13, the two bevelled gears cooperate to rock the auxiliary frame to its alternate limit position.

The means for releasably latching the auxiliary frame 55 at its two alternate positions is shown in FIGS. 16–18. FIG. 17 shows how a latch lever 155 for cooperation with the auxiliary frame 55 is mounted on the upwardly extending tube 124 of the main frame for cooperation alternately with latch shoes 156 and 158 which are fixedly mounted respectively on the angular arms 130 and 136 of the two auxiliary frames. The latch lever 155 is mounted by a pivot 160 on a bracket 162 that extends into a longitudinal slot 164 of the upwardly extending tube 124, the bracket being integral with and carried by a thin collar 165 that is secured by a screw 166. The lower arm of the latch lever 155 is adapted for releasable engagement with the two latch shoes 156 and 158 and is biased towards its effective position by a leaf spring 168 that presses against the upper arm of the latch lever. As may be seen in FIG. 18, each of the two latch shoes 156 and 158 has a tapered nose 170 so that as the latch shoe approaches the latch lever 155 the tapered nose initially cams the latch lever inwardly until the latch lever snaps into engagement with a notch 172 of the latch shoe.

The upper arm of the latch lever 155 has a lateral extension 174 that extends through a slot 175 of the tubular control shaft 148 into the interior of the control shaft. Since the control shaft 148 rotates through a range of 45°, the slot 175 has a circumferential extent of slightly more than 45°. The previously mentioned latch button 66 is on the upper end of a release pin 176 that has a tapered nose 178 for cam action on the lateral extension 174 of the latch lever, the release pin being biased to its upper limit position by a coil spring 180.

It is apparent that whenever the right hand handle 65 is swung to rock the auxiliary frame 55 of one of its alternate limit positions, the corresponding latch shoe 156 or 158 automatically cooperates with the latch lever 155 to latch the auxiliary frame at the limit position. To release the latch lever 155 it is merely necessary for the operator to depress the release button 66. Thus, to rock the auxiliary frame 55 from one of its limit positions to the other, the operator momentarily depresses the release button 66 and simultaneously swings the right hand handle 65, the release button being immediately released to permit automatic latching of the auxiliary frame at its new limit position.

Details of the overhead counterbalancing structure

FIGS. 1 and 1–A show how the upper end of the upright support 36 may be provided with a hinge yoke 182 having a shank 184 that may be either fixedly or rotatably mounted in the upright support. An advantage of fixedly mounting the hinge yoke 182 is that it keeps the overhead boom 38 in a vertical plane through the packing station and the supply station and thus tends to keep the pickup assembly 34 on the path of least distance between the two stations.

As shown in FIG. 1–A, the hinge yoke 182 has two parallel arms 185 that are spanned by a hinge pin 186.

The inner end of the overhead boom 38 has a similar hinge yoke 202 with two parallel arms 204 that are pivotally mounted on the same hinge pin. An angular adjustment arm 205 is also pivotally mounted on the hinge pin 186 centrally thereof and carries an adjustment screw 206 that abuts against the shank 184 of the yoke 182. The adjustment screw 206 is provided with a convenient operating handle 208 and is further provided with a wing nut 210 that serves as a lock nut to releasably maintain the adjustment screw at any position to which it may be rotated.

As shown in FIG. 1–A, each torque spring of a pair of previously mentioned torque springs 96 has one end 214 bearing against the angular adjustment arm 205 and has a second opposite end 215 bearing against the yoke 202 to tend to swing the overhead boom 38 upwardly, thereby to counterbalance the pickup assembly 34. It is apparent that the upward force exerted by the two torque springs 96 on the overhead boom 38 may be varied by the adjustment screw 206. Thus, in changing over from one pickup assembly 34 to another pickup assembly for packing fruit of a different size, the operator may release the lock nut 210 and rotate the adjustment screw 206 to provide whatever change in the counterbalancing force is desired.

By virtue of the torque springs the pickup assembly is yieldingly supported so that when it is loaded with fruit it is supported at a relatively low level and when it is not loaded it is supported at a higher level. Thus, the effort required by the operator is only the slight effort required to move the pickup assembly at one of the levels or to vary the level.

Details of the structure at the packing station

Referring to FIGS. 1 and 3, a box 30 at the packing station rests on a series of rollers 216 which permit easy egress of the packed box from the packing station and the box is surrounded on three sides by a frame generally designated 218 which is open at one end. The frame 218 is provided at its open end with a resilient latch member 220 which releasably retains a box in the frame. In this instance the box 30 is a corrugated paper carton and the latch member engages what may be termed the front end of the carton. As shown in FIG. 1, one side flap 222 of the carton is held in folded position by the adjacent structure of the supply chute 32 and the opposite side flap 224 is held in folded position by a hook 225 on the side of the frame 218. The flap at the rear end of the carton is folded down between the carton and the frame 218 and the flap 226 at the front end of the carton may be unrestrained.

The previously mentioned guide baffle 98 is positioned to overhang the rear end of the carton and is of convergent configuration in that its rear wall 228 and its two short side walls 230 are inclined with the upper open side of the guide baffle flared outwardly to greater cross dimension than the carton and with the lower open side of the guide baffle of substantially the same inside dimension as the carton. Thus, when the pickup assembly 34 is guided to the interior of the carton by the guide baffle 98, the guide baffle aligns one end of the pickup assembly with the rear end of the carton and when the pickup assembly is moved downwardly the layer of fruit thereon is slightly contracted to conform to the inside dimensions of the carton. In the construction shown the guide baffle 98 is provided with a rearwardly extended shank 232 that is releasably gripped by a split sleeve 236 on the upper end of a support post 238.

The structure at the supply station

Referring to FIGS. 1 and 3, the supply chute 32, which is supported by suitable legs 240, has a downwardly sloping base plate 242 and two upright side panels 244 with the previously mentioned downwardly sloping channel assembly 45 spaced above the base plate. As shown in FIGS. 3 and 5, the channel assembly 45 includes a series of what may be termed ridge members which form seven downwardly sloping channels or troughs to provide seven rows of the citrus fruit. The ridge members comprise two half-ridge members 245 at the opposite sides of the assembly and six full ridge members spaced between the two half-ridge members in parallel relationship thereto.

As may be seen in FIG. 5, each of the full ridge members 246 is of the general configuration of an inverted letter V with two oppositely inclined channel walls 248 and each of the half-ridge members provides only a single inclined channel wall 248. As may be seen in FIG. 3, each row of the citrus fruit comes to rest against a previously mentioned stop 48 and the seven stops are staggered or offset to cause the seven rows of fruit to be staggered with the individual fruit of one row opposite the junctures of two fruit of an adjacent row. As best shown in FIG. 4, each stop 48 may comprise a disk on a screw 254 that is mounted on a corresponding bracket 255, the screw being provided with a thumb nut 256 to serve as a lock nut for maintaining any adjustment at which the stop may be placed.

When the channel assembly 45 is in its expanded state shown in FIGS. 3 and 5, the ridge members are spaced relatively far apart to make the seven channels relatively wide and since the fruit seek the longitudinal center of each channel, the seven rows of fruit are spaced apart sufficiently to avoid interference with each other and to permit free gravitational movement of the fruit from a suitable supply hopper (not shown) at the upper end of the sloping channel assembly. On the other hand, when the channel assembly 45 is in the contracted state shown in FIGS. and 5-A and 11, the seven channels or troughs are narrowed to bring the seven rows of fruit together into nesting relationship.

At their lower ends, the eight ridge members are provided with downwardly extending legs 258, shown in FIG. 4, that are freely slidable on the surface of the base plate 242. Near their upper ends, the eight ridge members are supported by a relatively narrow transverse support plate 260, the opposite ends of which are spaced above the base plate 242 by support blocks 262, shown in FIGS. 3 and 5. Referring to the bottom plan view in FIG. 6 and the fragmentary longitudinal sectional view in FIG. 5, the support plate 260 carries a bracket 264 on its underside which divides the support plate into two longitudinal halves, and each of the longitudinal halves is formed with a corresponding longitudinal slot 265 which is of stepped cross sectional configuration as shown in FIG. 10.

The mechanism for laterally expanding and contracting the channel assembly 45 is illustrated by FIGS. 4–10 and will now be described.

The eight ridge members 245, 246 which rest on the transverse support plate 260 are interconnected by eight pairs of scissor links 270 which form a lazy tong assembly that may be expanded and contracted while maintaining the ridge members parallel and at equal spacing. Thus, if the channel assembly expanded and contracts, the spacing between the ridge members changes in proportion.

The mid-portions of the two scissor links 270 of each pair of scissor links share a common central pivot member 272. On one side of the lazy tong assembly, which is the lower side as viewed in FIG. 6, the successive outer ends of the pairs of scissor links 270 are interconnected by pivot members 274 which are fixedly mounted on the successive ridge members 245, 246. In the construction shown in the drawings, the underside of each end of each of the ridge members 245, 246 has a fixed cross bar 275 and the two cross bars at the opposite ends of a ridge member are mounted on the opposite ends of a support bar 276 that extends longitudinally of the ridge member. The pivot member 274 are fixedly mounted on the underside of the support bars 276 near ends thereof.

On the opposite side of the lazy tong assembly, which is the upper side as viewed in FIG. 6, the outer ends of the successive pairs of scissor links 270 share common pivot members 278 which, as indicated in FIGS. 6 and 8, are slidingly mounted in short slots 280 of the support bars 276 of the corresponding ridge members 245, 246, the short slots being of stepped cross sectional configuration. For the purpose of permitting longitudinal expansion and contraction of the lazy tong assembly, the seven central pivot members 272 must be variable in their spacing and for this purpose three of the central pivot members are mounted in one of the two longitudinal slots 265 of the transverse support plate 260, the remaining four pivot members being slidingly mounted in the other longitudinal slot.

Expansion and contraction of the lazy tong assembly in a manner that keeps the lazy tong assembly centralized relative to the transverse support plate 260 may be provided by a mechanism which will now be described.

The rocker arms 282 journalled in the bracket 264 on the underside of the transverse support plate 260 are integral with two corresponding intermeshed pinions 284 by means of which they are synchronized for swinging movement towards and away from each other. The outer ends of the two rocker arms 282 are connected by pivots 285 to the inner ends of two corresponding longitudinal links 286 and the outer ends of the longitudinal links are connected by pivots 288 to the two opposite half-ridge members 245, respectively. Thus, when the two rocker arms 282 are swung close together as shown in FIG. 7, the lazy tong assembly is contracted and when the rocker arms are swung away from each other as shown in FIG. 6, the lazy tong assembly is expanded.

The two rocker arms 282 are actuated by the previously mentioned power cylinder 85 and for this purpose, as shown in FIGS. 4 and 5, a piston rod 290 extending from the power cylinder is pivotally connected to a crank arm 292 that is in turn operatively connected to one of the two rocker arms. In the construction shown, the crank arm 292 is carried by a stub shaft 294 that is journalled in a suitable bearing 295 on the underside of the base plate 242 of the supply chute and a spindle 296 extending downwardly from one of the pinions 284 carries a cross pin 298 at its lower end which seats in a diametrical recess (not shown) in the upper end of the stub shaft. By virtue of this arrangement, the lazy tong assembly together with the channel assembly 45 of which it is a part may be lifted away from the stub shaft 294 when desired.

The reason for releasably connecting the lazy tong linkage to the stub shaft 294 is to permit one channel assembly 45 to be substituted for another channel assembly when a changeover is made from one size of citrus fruit to another. To make a channel assembly removable from the supply chute each end of the transverse support plate 260 is provided with a fixed downwardly extending pin 300 which seats in a bore 302 in a corresponding support block 262. The pin 300 is releasably engaged by a manually operable set screw 304 having a knob 305 on the outer side of the corresponding side panel 244 of the supply chute.

It is apparent that extension and retraction of the piston rod 290 will cause lateral expansion and contraction of the channel assembly 45 and that one channel assembly may be readily substituted for another channel assembly when desired.

When citrus fruit is fed from a bulk supply, an overhanging baffle designated 306 in FIGS. 11 and 11-A is necessary to keep more than one layer of fruit from moving onto the channel assembly. A feature of the invention in this respect is that the overhanging baffle 306 provides guide means for correctly positioning the pickup assembly 34 at the supply station. In the construction shown, a guide means 308 for this purpose is in the form of a bracket that slidingly straddles the overhanging baffle 306 and is releasably secured at any desired position by means of a pair of thumb screws 310.

In FIG. 11 where the pickup assembly 34 is represented in phantom with the main pickup head represented by the outline 58, the pickup assembly is adjusted to pick up a layer of the first pattern and the view indicates how one corner of the main pickup head abuts both the overhanging baffle 306 and the guide bracket 308. In FIG. 12 where the pickup assembly is adjusted to pick up a layer of the second pattern, the second auxiliary pickup head represented by the outline 62 is in abutment with both the overhanging baffle and the guide bracket.

Since the overhanging baffle 306 must be raised and lowered for fruit of different sizes and to cooperate with different interchangeable channel assemblies and since the overhead baffle must be adjustable forwardly and rearwardly for guiding cooperation with different interchangeable pickup assemblies, some convenient means is required to permit the various kinds of adjustment.

As shown in FIG. 11, each end of the overhanging baffle 306 is supported by a bracket 312 that is unitary with a travelling nut 314 on a horizontal screw 315, each horizontal screw being suitably journalled in bearings on the corresponding side panel 244 of the supply chute and being manually rotatable by a forward crank 316. As shown in FIG. 11-A, each of the brackets 312 is U-shaped with two parallel horizontal arms 318 and is provided with two vertically spaced lugs 320 for sliding contact with the side panel 244 to maintain the bracket in upright position.

FIG. 11-A shows how each end of the overhanging baffle 306 is united with an upright internally threaded sleeve 322 and slidingly extends through a slot 325 in the upper arm 308 of the bracket 312, the slot providing a necessary degree of freedom for the sleeve to tilt. The sleeve 322 is mounted on and supported by an upright adjustment screw 326 having an upper knob 328 for manual rotation. The adjustment screw 326 has a flanged fitting 332 on its lower end by means of which it is journalled in a bore 332 in the lower bracket arm 308. Since manual rotation of one of the horizontal screws 315 by its crank 316 changes the distance between the two brackets 312, the overhanging baffle 306 must be capable of longitudinal expansion and contraction. For this purpose, as shown in FIGS. 11-A and 11-B, the overhanging baffle is made in two sections 306a and 306b which telescope together. The section 306a is in the form of a flat plate and the section 306b is provided with longitudinal flanges 334 that slidingly confine the opposite longitudinal edges of the first section. It is apparent that appropriate manipulation of the two cranks 316 and the two adjustment screws 326 make it possible to place the overhanging baffle in any desired operating position.

Control system

In the pneumatic system shown in FIG. 19, a suitable source of compressed air (not shown) is connected through a pressure-reducing valve 335 with a line 336 that leads to a port of a two-position directional control valve 338 that is operated by a solenoid 340. A second port of the directional control valve 338 is connected by a line 342 to one end of the previously mentioned power cylinder 85 that expands and contracts the channel assembly 45 and a third port is connected by a line 344 to the other end of the power cylinder. Each of the lines 342 and 344 may be provided with a corresponding flow-rate control valve 345 having an integral check. A fourth port of the directional control valve 338 communicates with the atmosphere through a muffler 346.

A line 347 branching from the line 336 incorporates a pressure-reducing valve 348 and is connected to a port of a two-position directional control valve 350 that is operated by a solenoid 352. A second port of the directional control valve 350 is connected by a line 354 to one end of the previously mentioned booster cylinder 74 and a third port is connected by a line 355 with the other end of the booster cylinder. Each of the two lines 354 and 355 may incorporate a corresponding flow-rate control valve 356 that has an integral check. A fourth port of the directional control valve 350 communicates with the atmosphere through a muffler 358.

The outlet port of the previously mentioned air pump 68 is connected to a relief valve 360 and to a line 362 to a port of a two-position directional control valve 364 that is operated by a solenoid 365. The intake port of the air pump 68 is connected by a line 366 to a second port of the directional control valve 364. A third port of the valve 364 communicates with the atmosphere through a muffler 368 and a fourth port is connected through a valve 370 and a filter 372 to the previously mentioned passage 105 of the suspension arm 40, which passage communicates with the vacuum cups on the pickup assembly 34. As heretofore described, the passage 105 is connected to a guage 92 and to a pressure switch 95 that controls the previously mentioned signal lamp 94.

The wiring diagram shown in FIG. 20 relates to the pneumatic system shown in FIG. 19 and includes the following: a master switch 374 for placing the pickup assembly 34 in operation; the previously mentioned switch 86 on the overhead boom 48 for controlling the solenoid 340 of the master control valve 338 that operates the power cylinder 85 for expanding and contracting the channel assembly 45, the two previously mentioned push button switches 84 on the pickup assembly 34 that are in series with each other and in series with the solenoid 352 of the directional control valve 350 for the booster cylinder 74 that boosts the downward movement of the pickup assembly; and the previously mentioned push button switch 72 on the pickup assembly that is in series with the solenoid 365 of the directional control valve 364 that is associated with the air pump 68.

When the movement of the pickup assembly 34 towards the supply station closes the switch 86, the energization of the solenoid 340 actuates the power cylinder 85 to contract the channel assembly 45. When the pickup assembly 34 is poised over the fruit on the contracted channel assembly 45, closing of the two push button switches 84 on the pickup assembly energizes the solenoid 352 to cause the booster cylinder 74 to boost the pickup assembly downwardly into engagement with the fruit on the channel assembly.

When the solenoid 365 of the directional control valve 364 is de-energized, the intake line 366 of the air pump 68 is connected to the passage 105 that leads to the pickup assembly and air is continuously evacuated from the vacuum cups 35 so that movement of the vacuum cups into abutment with fruit at the supply station causes the vacuum cups to engage the fruit. The consequent energization of the signal lamp 94 indicates that all of the vacuum cups are in effective engagement with the fruit. When the push button switch 72 is subsequently closed to release a layer of fruit to the carton 30, the solenoid 365 operates the directional control valve 364 to connect the intake line 366 of the air pump with the muffler 368 and to connect the output line 362 with the passage 105 to destroy the vacuum in the vacuum system.

FIGS. 21 and 22 show modifications of the pneumatic system and the wiring diagram, respectively, which provide for an automatic upward boost of the pickup assembly 34 in response to engagement of all of the vacuum cups with a layer of fruit on the channel assembly 45.

As indicated by the reference numerals in FIG. 21, the components relating to the power cylinder 85 and the components relating to the air pump 68 are the same as in FIG. 19, the modification of the system relating solely to the booster cylinder 74 that applies boosting action to the overhead boom 38.

Since the piston 76 of the booster cylinder 74 must be capable of applying upward boosting movement to the overhead boom as well as downward boosting movement, the previously mentioned lever 78 that is operated by the piston rod is connected to the overhead boom 38 by a rigid link 380 instead of being connected to the boom by the previously mentioned cable 82. A further modification is the provision of the piston rod 76 with a collar 382 that trips the arm 384 of a normally closed switch 385.

The booster cylinder 74 is controlled by a three-position directional control valve 386 that may be shifted in one direction from its normal neutral position by a solenoid 388 and may be shifted in the opposite direction by a solenoid 390.

A line 392 connects one port of the three-position directional control valve 386 with the upper end of the booster cylinder 74, and a line 394 from another port of the valve is connected to the lower end of the power cylinder, each of these two lines being provided with a flow rate control valve 395 that has an integral check. At the central neutral position of the directional control valve 386, both of the lines 392 and 395 are connected through the open center of the valve with the atmosphere to place the piston in the booster cylinder 74 in a free floating state. Compressed air is supplied to the directional control valve 386 through a pressure reducing valve 396 and a line 398. When the solenoid 388 is actuated, the directional valve 386 connects the high pressure line 398 to the lower end of the booster cylinder 174 for upward movement of the piston rod 76 to boost the overhead boom 38 downwardly to cause the vacuum cups of the pickup assembly 34 to engage the fruit at the supply station. On the other hand, when the solenoid 390 is actuated the high pressure line 398 is connected to the upper end of the booster cylinder 74 to move the piston rod 76 downwardly for upward movement of the overhead boom to accelerate the pickup assembly 34 upwardly when the vacuum cups effectively engage fruit at the supply station.

The wiring diagram shown in FIG. 22 includes the following: a master switch 400 to make the apparatus operational; the previously mentioned switch 86 in series with the solenoid 340 for controlling expansion and contraction of the channel assembly 45; the previously mentioned push button switch 84 which are in series with each other and in series both with the valve solenoid 388 and a normally closed switch 402; a normally opened switch 404 which is in series wtih both the valve solenoid 390 and the above mentioned normally closed switch 385; and the push button switch 72 that is in series with the solenoid 365 of the directional control valve 364 that is associated with the air pump 368.

In FIG. 22 the dotted line 406 represents the vacuum system that is connected to the vacuum cups 35. The two switches 402 are pressure switches that respond to changes in pressure in the vacuum system. Normally, the pressure is relatively high because all of the vacuum cups are open to the atmosphere and switch 402 is closed and switch 404 is open. If all of the vacuum cups are blocked by fruit, the pressure drops to open switch 402 and close switch 404.

With the pickup assembly 34 poised above a layer of fruit at the supply station, simultaneous depression of the two push buttons 84 actuates the solenoid 388 to apply downward boosting force to the pickup assembly to bring the vacuum cups into engagement with the fruit. If all of the vacuum cups make effective engagement with fruit, the consequent drop in pressure in the vacuum system opens the vacuum switch 402 to de-energize the valve solenoid 388 and at the same time the drop in pressure closes the vacuum switch 404 to energize the valve solenoid 390 and a signal lamp 405, the signal lamp replacing the previously mentioned signal lamp 94 on the suspension arm 40. Energization of the valve solenoid 390 connects the high pressure line 398 to the upper end of the booster cylinder 74 to move the piston rod 76 downwardly to cause the desired upward acceleration of the pickup assembly. When the downward movement of the piston rod 76 approaches the lower limit position, the collar 382 opens the switch 385 to de-energize the solenoid 390 and thereby restore the three-position directional valve 386 to its neutral position to restore the piston in the booster cylinder 74 to its normal free floating state.

Modified forms of the channel assembly

The channel assembly 45a shown in FIGS. 23 and 24 is mounted on a base plate 242a of a supply chute and has the same half-ridge members 245 and full-ridge members 246 as the first described channel assembly. Instead of being mounted on the previously described scissor linkage assembly, the ridge members 245 and 246 are fixedly attached to a rubber sheet 410 which lies flat on the base plate and which may be stretched across its width to expand the channel assembly and may be released to contract the channel assembly. As shown in FIG. 24, the opposite longitudinal edges of the rubber sheet 410 are attached to angular side members 412 which are slidingly mounted on the base plate 242a and which have relatively thin overlapping portions 414 in the central region of the channel assembly to support the longitudinal central region of the rubber sheet.

The two angular side members 412 have corresponding brackets 415 extending downwardly through slots 416 in the base plate 242a and each bracket is connected to a corresponding sprocket chain 418 which extends around a portion of a corresponding sprocket 420 with the second end of the sprocket chain connected to the sprocket. The two sprockets 420 are mounted on corresponding shafts 422 that are journalled in suitable bearings and each of the two shafts carries a radial arm 425 for the purpose of controlling the corresponding sprocket. The two arms 425 converge and rest on a roller 226 in a slot in a fitting 428 on the end of a piston rod 430 that extends from the power cylinder 85a which corresponds to the previously mentioned power cylinder 85. The resistance of the rubber sheet 410 to stretching across its width maintains the two arms 425 in contact with the roller and spring means 432 interconecting the two brackets 415 reinforces the bias of the arms against the roller.

FIG. 24 shows the channel assembly 45a in its contracted state. It is apparent that if the piston rod 430 is extended by the power cylinder 85a the two arms 425 will be rocked in opposite rotary directions to cause the two sprocket chains 418 to move the angular side members away from each other for expansion of the channel assembly. Thus, the rubber sheet 410 is the functional equivalent of the previously described scissor linkage assembly.

FIGS. 25 and 26 indicate how the channels of another form of channel assembly may be formed by a series of laterally inclined longitudinal panels that are hingedly interconnected for expansion and contraction of the channels, the two oppositely inclined side walls of each channel being hingedly connected at the bottom of the channel and the upper edges of side walls of adjacent channels being hingedly interconnected. In the construction shown, the channels are formed by a single partially folded sheet of semi-rigid plastic material with the sheet formed with longitudinal grooves to provide the hinge connections. Thus, the sheet is formed with upper longitudinal grooves 435 at the junctions of side walls of adjacent channels and each channel has a narrow flat portion 436 at its bottom with longitudinal grooves 438 on opposite sides of the flat portion to serve as hinges for hingedly interconnecting the two side walls of the channel.

FIGS. 27 and 28 show a channel assembly 45b wherein such a sheet of zigzag cross section is mounted on a scissor linkage assembly generally designated 440 of the character heretofore described, the flat bottom portion 436 of each channel being mounted on a corresponding support means in the form of a previously described support bar 276a of the scissor linkage assembly. FIG. 27 shows how with the scissor linkage assembly 440 contracted the spacing between the support bars 276a is reduced to contract the channels in width for crowding the rows of fruit together. FIG. 28 shows how expansion of the scissor linkage assembly 440 reduces the inclination of the wall panels 434 with consequent widening of the channels to space the successive rows of fruit apart for free movement without interference with each other.

FIG. 29 indicates the construction of a channel assembly 45c in which the folded plastic sheet shown in FIGS. 25 and 26 is mounted on a rubber sheet 442, the flat bottom portions 436 of the channels being bonded to the rubber sheet. The rubber sheet 442 may be stretched across its width by a mechanism such as shown in FIG. 24 for expansion of the channel assembly.

Our description in specific detail of the presently preferred embodiment of the invention and the modifications thereof will suggest various changes, substitutions, and other departures from our disclosure within the spirit and scope of the appended claims. For example, as described above, the pickup assembly has a group of pickup elements in the form of vacuum cups to pick up fruit, but for handling other articles, other types of pickup elements may be employed. Thus, to pickup groups of steel cans or other ferromagnetic articles, the pickup elements may be switch-controlled electromagnets. In other applications of the invention the pickup elements may be remotely controlled jaws or claws.

What is claimed is:

1. In an apparatus for manual manipulation for picking up articles such as fruit or the like at a supply station and for depositing the articles at a packing station, the combination of:
   a pickup assembly having a group of pickup elements, said pickup assembly having handle means for manually maneuvering the pickup assembly to pick up groups of the articles at the supply station and to transport the articles to the packing station;
   overhead support means for the pickup assembly;
   counter balance means include in said overhead support means to at least partially support the pickup assembly to minimize the physical effort required for manual manipulation of the pickup assembly; and
   power means included in said overhead support means to apply boosting force to the overhead support means to facilitate change in elevation of the pickup assembly.

2. A combination as set forth in claim 1 in which said handle means comprises a pair of elongated handles in general alignment with the direction of travel of the pickup assembly and which includes manually operable means on the pickup assembly to operate said power boosting means.

3. A combinations set forth in claim 1 in which the power means is operable to boost the pickup assembly downward into engagement with the articles at the supply station.

4. A combination as set forth in claim 3 in which two controls on the pickup assembly are operable by the two hands respectively of an operator to cause the downward boosting force thereby to insure that neither of the two hands is under the pickup assembly.

5. A combination as set forth in claim 1 in which the power means is also operable to boost upward movement of the newly loaded pickup assembly from the supply station.

6. A combination as set forth in claim 5 in which the pickup elements are vacuum cups and which includes means to cause upward boosting force by the power means in response to the creation of a vacuum in the vacuum cups.

7. A combination as set forth in claim 1 in which the pickup elements are vacuum cups and which includes signal means responsive to the creation of a vacuum in all of the vacuum cups to indicate that the pickup assembly has engaged its full quota of articles.

8. A combination as set forth in claim 1 which includes guide wall means to guide the manual movement of the pickup assembly into a container at the packing station.

9. A combination as set forth in claim 1 which includes fixed guide means at the supply station for abutment by the pickup assembly for correct manual positioning of the pickup assembly relative to a group of the articles to be picked up.

10. A combination as set forth in claim 1 in which the pickup elements are vacuum cups and which includes:
    an air pump having an inlet port and an outlet port;
    a passage from the pump to the vacuum cups of the pickup assembly, said passage being normally connected to the inlet port of the pump to exhaust air from the passage; and
    means operable to change the connection of the passage means from the inlet port to the outlet port of the pump thereby to terminate a vacuum in the vacuum cups abruptly to release a group of articles from the pickup assembly.

11. A combination as set forth in claim 1 in which supply means at the supply station is operable in one respect to replenish the supply articles at the supply station and is operable in a second respect to group the articles compactly;
    and which includes means responsive to movement of the pickup assembly between said two stations to operate said supply means in the two respects successively during each operating cycle.

12. A combination as set forth in claim 11 in which said responsive means operates the supply means in the first respect in response to location of the pickup assembly away from the supply station and operates the supply means in the second respect in response to location of the pickup assembly near the supply station.

13. A combination as set forth in claim 11 in which said supply means includes an assembly of supply channels for the articles, said assembly being operable in one respect by expansion to permit free movement of the articles to the supply station and being operable in the opposite respect by contraction to group the articles compactly.

14. A combination as set forth in claim 1 in which said support means includes a suspension arm with the pickup assembly connected to the lower end of the arm, said arm being pivoted at its upper end to swing to carry the pickup assembly in an arc between the two stations.

15. A combination as set forth in claim 14 which includes means at the supply station to group the articles for engagement by the pickup assembly;

and which includes means to operate said grouping means in response to the swinging movement of said arm.

16. In an apparatus for packing articles in layers in a container at a packing station, wherein layers of a first pattern alternate with layers of a second pattern in the container for nesting of the successive layers, the combination of:

supply means at the supply station to supply said articles;

a pickup assembly having handle means for manual manipulation thereof to pick up groups of the articles at the supply station and to transport the groups of articles to the packing station;

manually swingable overhead means suspending the pickup assembly;

counterbalance means included in said overhead means to at least partially support the pickup assembly to minimize the physical effort required for manual manipulation of the pickup assembly;

a main pickup head included in said pickup assembly and having a plurality of pickup elements to pick up the articles, said pickup elements being operable to release the articles;

a first auxiliary pickup head having a plurality of similar pickup elements to cooperate with a main head to pick up a group of the first pattern at the supply station;

a second auxiliary head included in the pickup assembly and having a plurality of similar pickup elements to cooperate with the main head to pick up a group of the second pattern at the supply station; and manually operable means on the pickup assembly to place said auxiliary heads selectively at their alternate positions for cooperation with the main head.

17. A combination as set forth in claim 16 in which said pickup assembly has handle means for manually moving the pickup assembly between the supply station and the container, said handle means being manually operable to place said auxiliary heads selectively at their positions for cooperation with the main head.

18. A combination as set forth in claim 16 in which said pickup assembly includes a common support for the two auxiliary heads, said support being rotatable between a first position to place the first auxiliary head at its cooperating position and a second position to place the second auxiliary head at its cooperating position, said handle means being operative to rotate said support means to its two positions selectively.

19. A combination as set forth in claim 18 which includes means to latch the support means at its two positions and manually operable means on the pickup assembly to release said latch means.

20. In an apparatus for picking up articles at a supply station and for depositing the articles at a packing station, the combination of:

a pickup assembly having a group of pickup elements in the form of vacuum cups to pick up groups of the articles at the supply station and to transport the articles to the packing station;

an air pump having an inlet port and an outlet port;

a passage from the pump to the vacuum cups of the pickup assembly, said passage being normally connected to the inlet port of the pump to exhaust air from the passage; and means operable to change the connection of the passage from the inlet port to the outlet port of the pump thereby to terminate a vacuum in the vacuum cups abruptly to release a group of articles from the pickup assembly.

21. In an apparatus for manual manipulation to pick up articles such as fruit or the like at a supply station and to deposit the articles at a packing station, the combination of:

a pickup assembly having a group of pickup elements said having handle means for manual manipulation of the assembly to pick up groups of the articles at the supply station and to transport the articles to the packing station;

a rigid suspension arm;

means pivotally supporting the upper end of the suspension arm and confining the movement of the suspension arm to a vertical plane;

universal joint means suspending said pickup assembly from the lower end of said suspension arm for movement of the pickup assembly in said vertical plane between said two stations; and counterbalance means acting on the upper end of the suspension arm to compensate for at least a portion of the weight of the pickup assembly.

22. A combination as set forth in claim 21 which includes power means to apply boosting force to the upper end of the suspension arm to facilitate change in elevation of the pickup assembly;

and which includes manually operable means on the pickup assembly to control said power boosting means.

References Cited

UNITED STATES PATENTS

| | | | |
|---|---|---|---|
| 2,546,838 | 3/1951 | Tasche | 53—247 |
| 2,666,562 | 1/1954 | Birch | 53—247 |
| 2,921,701 | 1/1960 | Ireland | 294—88 X |
| 3,327,450 | 6/1967 | Carter | 53—247 X |
| 3,397,504 | 8/1968 | Drennan | 53—390 X |
| 3,453,802 | 7/1969 | Riddington | 53—247 X |
| 3,465,495 | 9/1969 | Zwiacher et al. | 53—247 X |

THERON E. CONDON, Primary Examiner

R. L. SPRUILL, Assistant Examiner

U.S. Cl. X.R.

53—78, 164, 247, 390; 294—64 R, 87 R

UNITED STATES PATENT OFFICE
CERTIFICATE OF CORRECTION

Patent No. 3,609,938      Dated October 5, 1971

Inventor(s) Paul F. Paddock

It is certified that error appears in the above-identified patent and that said Letters Patent are hereby corrected as shown below:

Column 5, line 54, "compact" should read --pack--.
Column 7, line 51, "degress" should read --degree--.
Column 10, line 7, "of" (first occurrence) should read --to--.
Column 11, line 64, "and" (first occurrence) should be deleted.
Column 12, line 50, "The" should read --Two--.
Column 17, line 15, "junctions" should read --junctures--.
Column 18, line 5, "combinations" should read --combination as--. Column 20, line 22, "said" should read --and--.

Signed and sealed this 2nd day of May 1972.

(SEAL)
Attest:

EDWARD M. FLETCHER, JR.      ROBERT GOTTSCHALK
Attesting Officer      Commissioner of Patents